Jan. 22, 1935.  H. SVANOE  1,988,759
HEAT RECOVERY SYSTEM
Filed Aug. 15, 1931
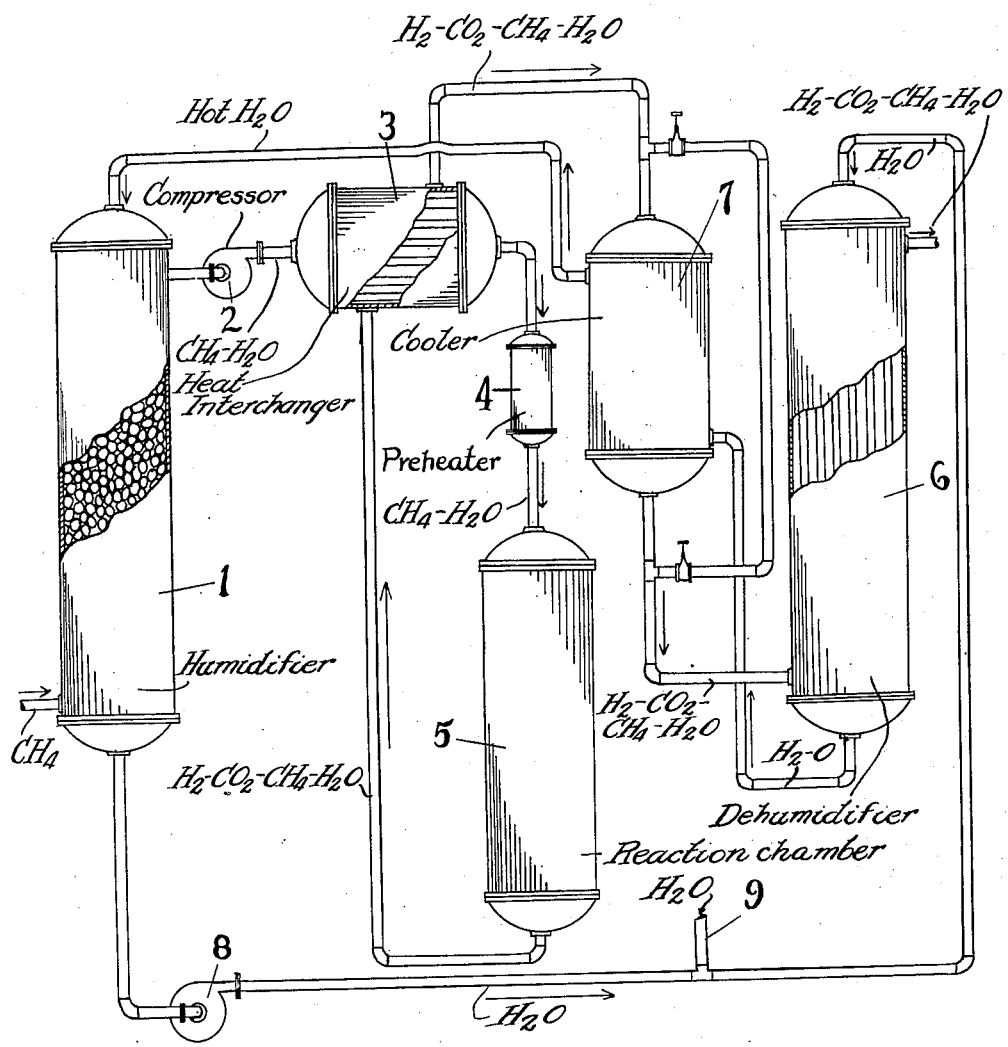
Inventor
Hans Svanoe Patented Jan. 22, 1935

1,988,759

UNITED STATES PATENT OFFICE 1,988,759

HEAT RECOVERY SYSTEM

Hans Svanoe, Fairville, Pa., assignor to E. I. du Pont de Nemours & Company, Wilmington, Del., a corporation of Delaware Application August 15, 1931, Serial No. 557,265

4 Claims. (Cl. 23—212)

This invention relates to a process for the recovery of heat from gaseous mixtures containing water vapor and particularly to an improved process in which the gas is humidified, a reaction effected, and the heat in the produced gases recovered.

In certain gaseous reactions requiring the presence of water vapor, it is often necessary to use an excess thereof over and above the stoichiometric requirements. For instance, in the preparation of hydrogen by the interaction of methane and steam, a steam:methane ratio as high as 20:1 may be desirable; in the production of hydrogen from steam and carbon monoxide, excess steam is also required for effecting the conversion of the carbon monoxide in an economical manner. In these and similar processes involving the employment of steam in excess of that consumed in the reaction, the hot products of the reaction contain considerable sensible and latent heat. For the economical operation of such processes, therefore, a large portion of the total heat held by the reacting gases must be recovered and returned to the system.

In conjunction with the above heat recovery considerations, the successful performance of such processes more often is determined by the ability to control the reaction temperatures closely and at the same time keep heat losses in the system as low as possible. An efficient system for the recovery of the heat contained in the gaseous mixtures leaving the reaction is, therefore, of great importance, in order to successfully carry out these reactions on a commercial scale.

A heat recovery system may, for instance, be operated as follows: the hot gases leaving the reaction chamber are brought into contact with water, the gas and water flowing counter-current. A substantial part of the total heat contained in the gaseous mixture is thereby transmitted to the water, which is then circulated counter-current to the comparatively cold unreacted gaseous mixture. This treatment preferably may be performed in a packed tower. The cold unreacted gaseous mixture is thereby heated and the humidity of the gas increases with the temperature to such an extent, that the content of the water vapor in the gaseous mixture very closely follows the saturation curve (dew-point curve). The water being discharged from the humidifying towers is then circulated back again to the dehumidifying section.

In a heat recovery system as outlined above sufficient heat recovery will depend upon many factors, as, for example, the temperature of the water leaving and entering both the humidifier and dehumidifier, dew-point temperature of the gas entering the humidifier, the efficiency of the humidifying and dehumidifying column, etc.

Objects of this invention are to provide an efficient process for the recovery of heat from gaseous mixtures containing water vapor and to effect the humidification and dehumidification of a gas by the recirculation of such a quantity of water in a closed circulatory system that substantially the maximum amount of heat may be retained within the system.

Other objects and advantages of the invention will be more readily understood by reference to the following specification and to the accompanying drawing which illustrates diagrammatically an apparatus in which my heat recovery process may be advantageously conducted.

Processes of the type referred to above, in which heat recovered from the reaction products is utilized to humidify fresh gases, reduce the amount of heat carried from the system and effect a "saving in steam consumption. The efficiency of the recovery system is governed practically entirely by the amount of heat taken up by the water in the dehumidifier from the gas passing therethru, and imparted to the fresh incoming gases. When dealing with such a recirculatory process we are not entirely free to state the given conditions, such as quantity and temperature of the water entering the dehumidifier and humidifier, because it is self-evident that the water entering the dehumidifier has just passed thru the humidifier and the temperature of that water, therefore, is determined by the amount of heat it has given up to the incoming fresh gases. Nor is it practicable to determine under actual operating conditions the quantity of water which should be circulated thru a given dehumidification and humidification apparatus to give the maximum efficiency.

I have found, however, that processes such as those described above or similar processes, can be rendered highly efficient in amount of heat recovered if for every 1000 cubic feet of dry gas leaving the reaction apparatus per hour there is recirculated thru the humidification and dehumidification units from approximately 350 to 3000 pounds of water per hour and preferably from 800 to 1900 pounds of water per hour.

The drawing illustrates diagrammatically one form of system in which my heat recovery process can be efficiently and economically conducted. It is to be understood that this is but a specific embodiment of such processes and will in no way restrict the scope of the invention. The apparatus will be described assuming that the conversion of methane and steam to hydrogen is being effected therein. The methane after compression to from 10–30 atmospheres, by means not shown, is passed upwardly thru the humidifier (1) which may be of any suitable type of construction, such, for example, as a packed tower. In passing thru the humidifier (1) the methane contacts with hot water which is flowing counter-current to it. The methane issues from the humidifier in a saturated condition and after passing thru the compressor (2) which increases the pressure on the gas from approximately 2–4 atmospheres above the initial pressure employed, is forced into the heat interchanger (3), of any conventional type, in which it receives heat from the hot products of the reaction. From the heat interchanger the gases pass thru the preheater (4) and then directly into the reaction chamber (5) wherein the conversion of the methane and steam to hydrogen is conducted in the presence of a suitable catalyst for the reaction. The gases issuing from the converter which consist principally of carbon dioxide and hydrogen repass thru the heat exchanger (3), out of contact with the gases from the humidifier which are passing therethru, and from the heat exchanger they may be passed directly to the dehumidifier (6), if the dehumidifier is of the tubular form. If a dehumidifier of the packed type is employed it is preferable to cool the gases prior to their admission to the dehumidifier. This may be readily carried out by means of the cooler (7) in which, for example, the cooled water from the dehumidifier passes in heat exchange relation with the superheated converted gases. The cooler (7) should be of such size that the converted gases are cooled to substantially their dew-point so that upon entering the dehumidifier the gas would substantially instantaneously begin to lose its moisture content. If a superheated gas were passed into a packed dehumidifier, on the other hand, a slight humidification would be effected in the lower part of this apparatus and as a result the potential heat in the cooling water leaving the dehumidifier would be considerably less. This condition, of course, is not met with if the dehumidifier is of the tubular type. Any water vapor carried from the dehumidifier (6) by the gas may be condensed in a condenser not shown. The hot water emerging from the dehumidifier (6), is passed into the humidifier (1) after circulating thru the cooler (7), if such be employed, and in the humidifier (1) contacts directly with the incoming gases. Because of the heat required to humidify these gases, the temperature of the unvaporized water leaving the bottom of the humidifier is considerably cooled; this cooled water is forced by the pump (8) back into the top of the dehumidifier (6) and the cycle repeated. Make-up water, of which a portion may be the condensate obtained from the final mixture, may be added at any point in the water cycle, but it is preferable to add it to the cold water leaving the humidifier and entering the dehumidifier at point (9) for example.

By effecting methane: steam conversion, carbon monoxide: steam conversion, and like processes in apparatus as described above and with amounts of water circulating thru the humidifier (1) and the dehumidifier (6) such as I have found highly advantageous, unusual efficient operation will be realized, for example,—atmospheric pressure water gas conversion conducted therein, in which less than 350 pounds of water per 1000 cu. ft. of dry gas leaving the converter are employed will give a heat recovery of approximately 20% or less, while if my preferred range, 800–1900, is used, an efficiency of approximately 50% or better will be realized. This unexpected increase in efficiency is perhaps more markedly shown in pressure contact conversion processes. For instance, if the carbon monoxide steam conversion reaction, conducted at 20 atmospheres pressure, is carried out with less than 350 pounds of water per 1000 cu. ft. of converted gas, the heat efficiency will be often as low as 25%, yet, if, say, 1500 pounds of water per 1000 cu. ft. of gas is circulated thru the system, an efficiency of 65% or better may be obtained.

I claim:

1. In a method of effecting heat transfer requiring the humidification and dehumidification of a gas which undergoes conversion within the system, excess water vapor being employed over that used to react with the gas, and in which water recirculates through the humidification and dehumidification stages thereof in a closed cycle, the step which comprises circulating in said closed cycle from approximately 800 to approximately 1900 pounds of water per 1000 cubic feet of dry gas leaving the converter.

2. In a method of effecting heat transfer requiring the humidification and dehumidification of a gas which undergoes conversion within the system, excess water vapor being employed over that used to react with the gas, and in which water recirculates thru the humidification and dehumidification stages thereof in a closed cycle, the step which comprises effecting said process under pressure and employing in said closed cycle approximately 1500 pounds of water per 1000 cubic feet of dry gas leaving the converter.

3. In a carbon monoxide: steam conversion process employing humidification, dehumidification, and elevated pressure, the step which comprises circulating through the humidification and dehumidification stages of said process from approximately 800 to approximately 1900 pounds of water per 1000 cubic feet of dry gas leaving the converter.

4. In a carbon monoxide: steam conversion process involving humidification and dehumidification under pressure the step which comprises circulating through said humidification and dehumidification stages of said process approximately 1500 pounds of water per 1000 cubic feet of dry gas leaving the converter.

HANS SVANOE.